United States Patent
Hovland et al.

(10) Patent No.: US 8,093,303 B2
(45) Date of Patent: Jan. 10, 2012

(54) PROCESS FOR DEWATERING A MINERAL SLURRY CONCENTRATE AND INCREASING THE PRODUCTION OF A FILTER CAKE

(75) Inventors: Keith C. Hovland, Wadsworth, OH (US); Todd W. Groff, Beaver, PA (US); Monica A. Yorke, Coraopolis, PA (US); Charles R. Sundberg, Ishpeming, MI (US); Michael P. Lesar, Aurora, MN (US); Ruta O. Rakutis, Carlsbad, CA (US)

(73) Assignee: Neo Solutions, Inc., Beaver, PA (US)

( * ) Notice: Subject to any disclaimer, the term of this patent is extended or adjusted under 35 U.S.C. 154(b) by 0 days.

(21) Appl. No.: 12/887,740

(22) Filed: Sep. 22, 2010

(65) Prior Publication Data

US 2011/0009534 A1 Jan. 13, 2011

Related U.S. Application Data

(62) Division of application No. 11/880,716, filed on Jul. 24, 2007, now Pat. No. 7,824,553.

(51) Int. Cl.
*B01D 37/03* (2006.01)

(52) U.S. Cl. ............ 516/78; 210/728; 210/778; 252/60; 252/194; 516/43; 516/45; 516/203

(58) Field of Classification Search .................... 210/727
See application file for complete search history.

(56) References Cited

U.S. PATENT DOCUMENTS

| | | | |
|---|---|---|---|
| 3,867,330 A | 2/1975 | Frisque | |
| 4,035,317 A | 7/1977 | Gershberg | |
| 4,039,466 A | 8/1977 | Matsuda et al. | |
| 4,156,649 A | 5/1979 | Quinn et al. | |
| 4,191,653 A | 3/1980 | Hampton | |
| 4,206,063 A | 6/1980 | Wang et al. | |
| 4,207,186 A | 6/1980 | Wang et al. | |
| 4,210,531 A | 7/1980 | Wang et al. | |
| 4,684,549 A | 8/1987 | Allen et al. | |
| 4,751,259 A | 6/1988 | Roe et al. | |
| 4,802,914 A | 2/1989 | Rosen et al. | |
| 4,990,264 A | 2/1991 | Fuller et al. | |
| 5,002,607 A | 3/1991 | Flesher et al. | |
| 5,171,781 A | 12/1992 | Farrar et al. | |
| 5,178,774 A | 1/1993 | Payne et al. | |
| 5,346,630 A | 9/1994 | Kenney | |
| 5,372,727 A | 12/1994 | Koester et al. | |

(Continued)

FOREIGN PATENT DOCUMENTS

WO 02/079099 A1 10/2002

*Primary Examiner* — Peter A Hruskoci

(74) *Attorney, Agent, or Firm* — Craig G. Cochenour; Buchanan Ingersoll & Rooney PC

(57) ABSTRACT

The present invention provides a process for dewatering a mineral slurry concentrate and increasing the production of the resulting filter cake consisting essentially of mixing an aqueous mineral slurry concentrate with an effective amount of a nonionic surfactant and an effective amount of a cationic polymer to form a nonionic surfactant and cationic polymer treated aqueous mineral slurry concentrate, and subjecting the treated aqueous mineral slurry concentrate to a liquid water removal process for dewatering the treated aqueous mineral slurry and for increasing the production of a resulting filter cake of the dewatered mineral slurry. An improved mineral slurry concentrate composition and an improved mineral concentrate filter cake is also disclosed.

22 Claims, 1 Drawing Sheet

U.S. PATENT DOCUMENTS

| | | |
|---|---|---|
| 5,698,109 A | 12/1997 | Payne et al. |
| 5,725,780 A | 3/1998 | Carpenter et al. |
| 5,779,910 A * | 7/1998 | Donlin .......................... 210/726 |
| 6,526,675 B1 | 3/2003 | Yoon |
| 6,536,595 B2 | 3/2003 | Kowalski et al. |
| 6,733,674 B2 * | 5/2004 | Sarkar et al. .................. 210/632 |
| 6,799,682 B1 | 10/2004 | Yoon |
| 6,855,260 B1 | 2/2005 | Yoon |
| 2004/0034156 A1 | 2/2004 | Song |

* cited by examiner

PROCESS FOR DEWATERING A MINERAL SLURRY CONCENTRATE AND INCREASING THE PRODUCTION OF A FILTER CAKE

BENEFIT OF PRIOR PATENT APPLICATION

This utility patent application is a divisional patent application of and claims the benefit of prior U.S. Utility patent application Ser. No. 11/880,716, filed on Jul. 24, 2007, now U.S. Pat. No. 7,824,553, granted Nov. 2, 2010, having the same named applicants as inventors, namely, Keith C. Hovland, Todd W. Groff, Monica A. Yorke, Charles R. Sundberg, Michael P. Lesar, and Ruta O. Rakutis. The entire contents of U.S. Utility patent application Ser. No. 11/880,716 is incorporated by reference into this divisional utility patent application.

BACKGROUND OF THE INVENTION

1. Field of the Invention

The present invention relates to a process and synergistic composition for dewatering an aqueous mineral slurry and increasing the production of a resulting filter cake. In particular, this invention provides such a process and synergistic composition wherein the aqueous mineral slurry is dewatered by mixing it with an effective amount of a nonionic surfactant and with an effective amount of a cationic polymer, and subjecting the above to a filtration process for removing the water and increasing the production of the resulting filter cake.

2. Background Art

Numerous mineral ores are processed to recover the most valuable components. The ores are processed, for example but not limited to, by crushing, sieving, cycloning, washing, floating and thickening to concentrate the most desired components to form a concentrated aqueous mineral slurry. Components of minerals generally are concentrated by these procedures that are well known by those skilled in the art. Such a concentrated mineral slurry is customarily then subject to a dewatering process in order to achieve liquid water removal from the concentrated mineral slurry. As used herein in the present invention, the term "concentrated mineral slurry" may be for example but not limited to concentrates of iron ores, copper ores, combinations thereof, salts, oxides and sulfides thereof, and in particular, magnetite iron ore. Other examples of a concentrated mineral slurry may contain metals such as molybdenum, nickel, zinc ore, platinum group metals, sand and gravel. As used herein in the present invention, concentrated mineral slurry does not include hematite iron ore or coal. One of the final recovery steps usually involves some form of solid/liquid separation, i.e. filtration or centrifugation. The residual moisture contained in the concentrated mineral ore product can greatly affect subsequent processing of the product such as for example but not limited to pelletizing or smelting or even transportation costs.

Concentrated mineral slurries have been the subject of dewatering processes for many years. The dewatering process endeavors to achieve liquid water removal from the concentrated mineral slurry. A goal of the dewatering process is to decrease the residual liquid water content of the starting mineral slurry concentrate. Dewatering additives such as flocculants in combination with an anionic surfactant have been added to concentrated mineral slurries to reduce the liquid water content of the treated slurry being subjected to filtration. In theory, dewatering aids should increase production rates as well as decrease the amount of water present in the filtered ore or coal cake solids. Because the filtered solids contain less water, the overall production is expected to increase. However, in practice this is not always observed. Employing the additives and additive combinations known to those skilled in the art, not only does the moisture of the filtered solids decrease but the production solids decrease as well when compared to the untreated ore slurry. Traditionally, polymers have been used to agglomerate solids and increase the filtration rate. However, polymers tend to entrain water with the solids and thus cause the moisture content of the ore cake to increase. In many instances, the end use or processing of the coal or metal ore is detrimentally affected by the higher moisture content.

Up to now, an effective process to dewater mineral slurry is viewed as an opportunity to increase solids production by lowering the residual moisture in the product and inferring increased production through better and more rapid filtration. Elimination of the moisture in the filter cake or centrifuge solids increases the amount of mineral or ore solids on a weight percent basis, thereby reducing freight costs required for transport or energy costs for further drying or processing per kilogram of the mineral, coal or ore solids. However, the use of a dewatering aid alone usually results in some production loss of the filter cake when compared to no treatment at all.

Thus, it is known by those skilled in the art that generally when the moisture content of an aqueous mineral slurry concentrate is beneficially reduced by use of certain additives, a disadvantage also occurs in that the production of the resulting filter cake is decreased at the expense of achieving the beneficial dewatering. None of the background art processes have addressed both the need to reduce the residual liquid water content of the concentrated mineral slurry while simultaneously increasing the production of the mineral concentrate filter cake that results from the water removal process such as for example but not limited to a filtration process. The present applicants have developed such a process and synergistic additive combination that advantageously provides for a reduction in the residual liquid water content of the concentrated mineral slurry while also providing for an increased production of the filter cake that results from the water removal process.

U.S. Pat. No. 4,207,186 (Wang et al. '186) provides a process for dewatering mineral and coal concentrates comprising mixing an aqueous slurry of a mineral concentrate and an effective amount of a dewatering aid that is a combination of hydrophobic alcohol having an aliphatic radical of eight to eighteen carbon atoms and a nonionic surfactant of the formula $R\!-\!(OCH_2CH_2)_xOH$ wherein x is an integer of 1-15, R is a branched or linear aliphatic radical containing six to twenty-four carbon atoms in the alkyl moiety, and subjecting the treated slurry to filtration. Wang et al. '186 states that when a hydrophobic alcohol such as decyl alcohol is combined with a nonionic surfactant, lower moisture contents are obtained with iron ore concentrate than had a dewatering aid not been employed. Wang et al. '186, however, is unconcerned with increasing the production of the resulting filter cake.

U.S. Pat. No. 4,210,531 (Wang et al. '531) provides a process for dewatering mineral concentrates which consists essentially of first mixing with an aqueous slurry of a mineral concentrate an effective amount of a polyacrylamide flocculant, and next mixing with the flocculant-treated slurry an effective amount of a combination of an anionic surface active agent composition and a water insoluble organic liquid selected from aliphatic hydrocarbons, aromatic hydrocarbons, aliphatic alcohols, aromatic alcohols, aliphatic halides, aromatic halides, vegetable oils and animal oils, wherein the water-insoluble organic liquid being different from any water-insoluble organic liquid present in the anionic surface active agent composition, and thereafter removing the water as a liquid from the slurry. Wang et al. '531, however, does not address and is unconcerned with reducing the residual liquid water content of the concentrated mineral slurry and increasing the production of the resulting filter cake.

The present applicants have found unexpected results with the process of the instant invention in that the present applicants are able to (1) reduce the moisture (liquid water) content of a concentrated mineral slurry that has been treated with their synergistic combination of a nonionic surfactant and cationic polymer, and subjected to a filtration process, and (2) increase the production of the resulting filter cake. Thus, applicants process and synergistic composition combination provides the added economic benefit of increased filter cake production compared to the use of known synergistic combinations of additives that solely reduce the liquid water content of the concentrated mineral slurry. Thus, applicants process and synergistic composition combination fulfills a long-felt but heretofore unmet need in the mineral processing industry.

SUMMARY OF THE INVENTION

The present invention provides a process for dewatering a mineral slurry concentrate and increasing the production of the resulting filter cake consisting essentially of mixing an aqueous mineral slurry concentrate with an effective amount of a nonionic surfactant and an effective amount of a cationic polymer to form a nonionic surfactant and cationic polymer treated aqueous mineral slurry concentrate, and subjecting the nonionic surfactant and cationic polymer treated aqueous mineral slurry concentrate to a liquid water removal process for dewatering the treated aqueous mineral slurry and for increasing the production of a resulting filter cake of the dewatered mineral slurry.

The process includes wherein the nonionic surfactant is an alkyl ethoxylate alcohol having the chemical formula R—$(OCH_2CH_2)_x$OH wherein x is an integer from about 1 to 15, inclusive, and R is a linear or branched aliphatic radical comprising from about 6 to about 24 carbon atoms, inclusive, in the alkyl moiety, and having a hydrophilic-lipophilic balance number from about 1 to about 15, inclusive. As used herein, the terms "alkyl ethoxylate alcohol", "ethoxylate alcohol", "ethoxylated alcohol", and "alcohol ethoxylate" refer to the same composition represented by this chemical formula as described herein, and these terms may be used interchangeably herein.

In a preferred embodiment of this process as described herein, the alkyl ethoxylate alcohol comprises an R group having from about 6 to about 24 carbon atoms, inclusive, and is one of a linear primary ethoxylated alcohol, a branched primary ethoxylated alcohol, or a secondary ethoxylated alcohol. More preferably, the process includes wherein the R group has from about 11 to about 16 carbon atoms, inclusive. With regard to the ethoxylate groups, it is preferable that x is a number from about 1 to about 5, inclusive. It is known by those skilled in the art that in ethoxylation, because the commercially available alcohols are mixtures of different chain lengths, a mixed ethoxylate is obtained. This is also true for the degree of ethoxylation (i.e. number of "x" groups) on the alcohol. The value of "x" as used herein is an average number of ethoxylation. Thus, it will be understood by those persons skilled in the art that mixed ethoxylates are within the scope of this invention.

In another embodiment of this invention, the process includes wherein the nonionic surfactant is a mixture of the alcohol ethoxylate, as described herein, and an other alcohol. The other alcohol is an alcohol having from about one carbon atom to about 18 carbon atoms, inclusive, and preferably has from about 8 carbon atoms to about 13 carbon atoms, inclusive. The other alcohol may be primary or secondary and may be linear or branched, and mixtures thereof. The nonionic surfactant mixture may be comprised from about 1 weight percent to about 99 weight percent, inclusive, of the other alcohol.

Another embodiment of the process of this invention as described herein includes wherein the nonionic surfactant is an amine ethoxylate having the chemical formula R—N—$((CH_2CH_2O)_x$—$H)_2$ wherein x is an integer from about 1 to about 15, inclusive, and R is a linear or branched aliphatic radical comprising from about 6 to about 24 carbon atoms, inclusive, in the alkyl moiety, or a mixture of the amine ethoxylate and the alkyl ethoxylate alcohol as described herein. The nonionic surfactant mixture may be comprised from about 1 weight percent to about 99 weight percent, inclusive, amine ethoxylate.

The process of the present invention as described herein includes wherein the cationic polymer is derived from at least one cationic monomer comprising a quaternary diallyldialkyl ammonium monomer, a cationic acrylamide monomer, a quaternized derivative of an acrylate or methacrylate, salts thereof, and combinations thereof. More preferably, the cationic polymer is derived from at least one cationic monomer that is selected from the group consisting of acryloyloxyethyltrimethyl ammonium chloride, acryloyloxyethyltrimethyl ammonium methosulfate, aminomethylated polyacrylamide, methacrylamidopropyltrimethyl ammonium chloride, acrylamidopropyltrimethyl ammonium chloride, methacryloyloxyethyltrimethyl ammonium chloride, methacryloyloxyethyltrimethyl ammonium methosulfate, diallyldimethyl ammonium chloride, diallyldiethyl ammonium chloride, diallyldimethyl ammonium bromide, and diallyldiethyl ammonium bromide. In another embodiment of this invention, the cationic polymer is a copolymer that is derived from a cationic monomer that is a quaternary diallyldialkyl ammonium monomer, and an acrylamide. Most preferably, in another embodiment of this invention, the cationic polymer is derived from a cationic monomer that is acryloyloxyethyltrimethyl ammonium chloride, and an acrylamide. In another embodiment of the present invention, the cationic polymer is polydiallyldimethylammonium chloride. In yet another embodiment of this invention the cationic polymer is a Mannich condensation polymer, and preferably is a Mannich condensation polymer comprising acrylamide, dimethylamine or diethylamine, and formaldehyde.

Another embodiment of this invention provides an improved mineral slurry concentrate composition consisting essentially of an aqueous mineral slurry concentrate, a nonionic surfactant, and a cationic polymer, as described herein.

In another embodiment of this invention, an improved mineral concentrate filter cake is provided consisting essentially of a substantially dewatered mineral concentrate, a nonionic surfactant, and a cationic polymer, as described herein.

DETAILED DESCRIPTION OF THE INVENTION

Figure 1:
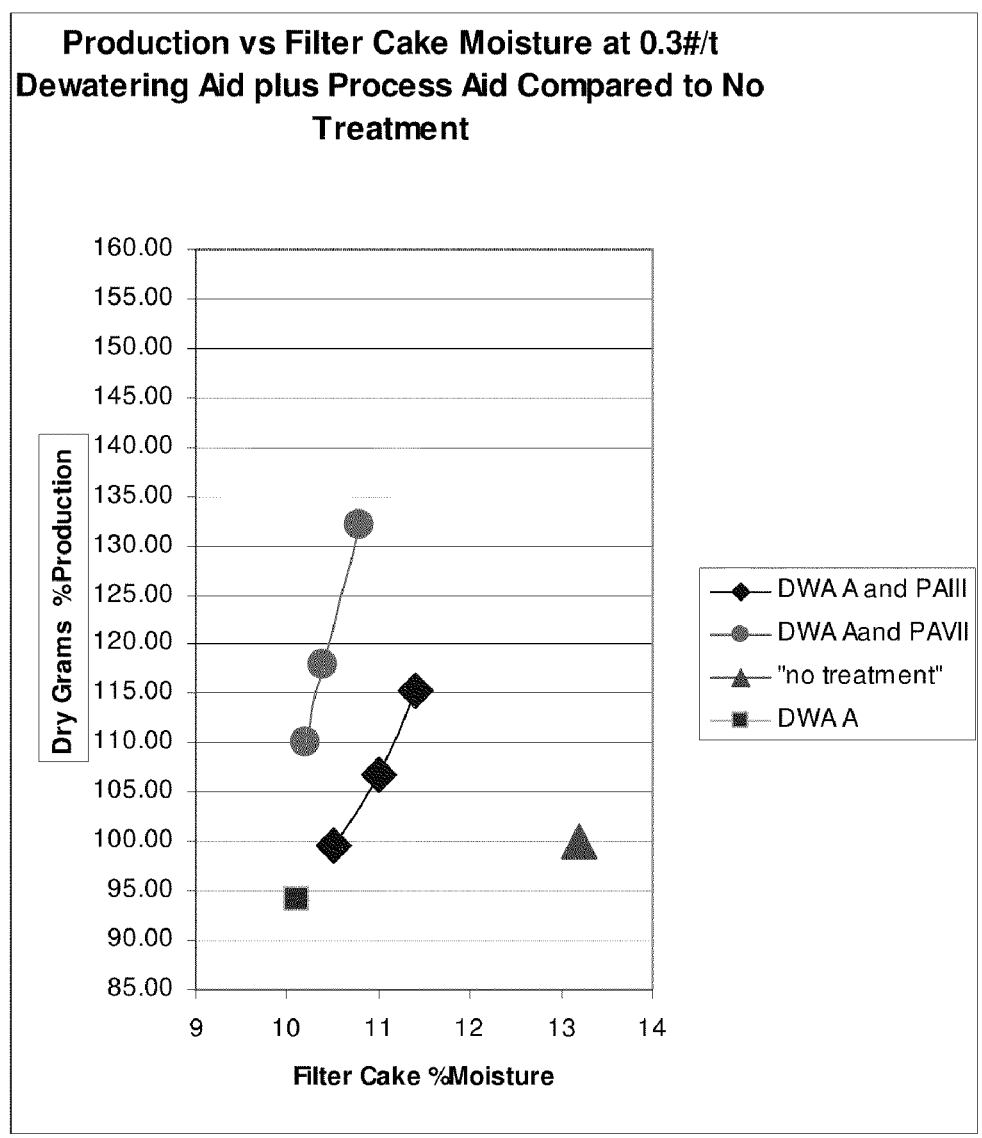
FIG. 1 is a graph that shows the dry filter cake production versus filter cake moisture content with employing the process of the present invention as compared to no treatment or treatment with use of a dewatering aid alone.

The instant invention is directed to (a) a process for dewatering a mineral slurry concentrate and increasing the production of the resulting filter cake, (b) an improved mineral slurry concentrate, and (c) an improved mineral concentrate filter cake.

As used herein, "effective amount" refers to that amount of the composition necessary to bring about a desired result, such as for example, the amount needed to effect the removal of water from an aqueous mineral slurry concentrate while increasing the production of a resultant filter cake.

As used herein, "substantially dewatered mineral concentrate" refers to an aqueous mineral slurry concentrate that has had a desired amount of moisture removed, and preferably the amount of moisture that is removed is more than about 40 percent (%) based on weight. Thus, for example but not limited to, a substantially dewatered mineral concentrate is one in which the initial moisture content before treatment is reduced to a desired level after treatment as set forth in the various examples provided in Tables 1-5 herein.

The present invention provides a process for dewatering a mineral slurry concentrate and increasing the production of the resulting filter cake consisting essentially of mixing an aqueous mineral slurry concentrate with an effective amount of a nonionic surfactant and an effective amount of a cationic polymer to form a nonionic surfactant and cationic polymer treated aqueous mineral slurry concentrate, and subjecting the nonionic surfactant and cationic polymer treated aqueous mineral slurry concentrate to a liquid water removal process for dewatering the treated aqueous mineral slurry and for increasing the production of a resulting filter cake of the dewatered mineral slurry.

As used herein, the term "nonionic surfactant" refers to a dewatering aid (abbreviated elsewhere herein as "DWA"). The nonionic surfactant or DWA is an alkyl ethoxylate alcohol having the chemical formula $R-(OCH_2CH_2)_xOH$ wherein x is an integer from about 1 to 15, inclusive, and R is a linear or branched aliphatic radical comprising from about 6 to about 24 carbon atoms, inclusive, in the alkyl moiety, and having a hydrophilic-lipophilic balance (HLB) number from about 1 to about 15, inclusive, and preferably a HLB number from about 1 to about 10, inclusive. Preferably, the alkyl ethoxylate alcohol comprises an R group having from about 8 to about 20 carbon atoms, inclusive, and is one of a linear primary ethoxylated alcohol, a branched primary ethoxylated alcohol, or a secondary ethoxylated alcohol. More preferably, the R group has from about 11 to about 16 carbon atoms, inclusive. With regard to the ethoxylate groups, it is preferable that x is a number from about 1 to about 5, inclusive.

The cationic polymer is derived from at least one cationic monomer comprising a quaternary diallyldialkyl ammonium monomer, a cationic acrylamide monomer, a quaternized derivative of an acrylate or methacrylate, salts thereof, and combinations thereof. More preferably, the cationic polymer is derived from at least one cationic monomer that is selected from the group consisting of acryloyloxyethyltrimethyl ammonium chloride, acryloyloxyethyltrimethyl ammonium methosulfate, aminomethylatedpolyacrylamide, methacrylamidopropyltrimethyl ammonium chloride, acrylamidopropyltrimethyl ammonium chloride, methacryloyloxyethyltrimethyl ammonium chloride, methacryloyloxyethyltrimethyl ammonium methosulfate, diallyldimethyl ammonium chloride, and diallyldiethyl ammonium chloride, diallyldimethyl ammonium bromide, and diallyldiethyl ammonium bromide. Most preferably, the cationic monomer is acryloyloxyethyltrimethyl ammonium chloride. Preferably, the cationic polymer is a copolymer that is derived from a cationic monomer that is a quaternary diallyldialkyl ammonium monomer, and an acrylamide. In another embodiment of this invention, the cationic polymer is polydiallyldimethylammonium chloride.

In yet another embodiment of this invention the cationic polymer is a Mannich condensation polymer. Preferably, the Mannich condensation polymer comprises acrylamide, dimethylamine or diethylamine, and formaldehyde. For example, but not limited to, the Mannich polymers may be synthesized using a 1:1:1 molar ratio of acrylamide, dimethylamine (or diethylamine), and formaldehyde. As known by those persons skilled in the art, the Mannich process uses ammonia or primary or secondary amines with formaldehyde and a carbonyl function next to an acidic proton to create a beta-aminocarbonyl compound. Here, for example, the carbonyl is acrylamide and the secondary amine is dimethylamine. The average molecular weight ranges of the Mannich polymers range from about 3 million to about 10 million, inclusive.

As used herein, the term "diallyldialkyl ammonium monomer" refers to any water soluble monomer of the formula $DADAAX^-$ which represents diallyldialkyl ammonium $X^-$ wherein each alkyl is independently selected from an alkyl group of from about 1 to 18 carbon atoms in length, inclusive, and preferably from about 1 to 6 carbon atoms in length, inclusive, and wherein $X^-$ is any suitable counterion. Preferably, the counterions are selected from the group consisting of halide, hydroxide, nitrate, acetate, hydrogen sulfate, methyl sulfate, and primary sulfates. The halide may be any halide, and more preferably is one selected from the group consisting of fluoride, bromide, and chloride. Preferably the quaternary diallyldialkyl ammonium halide monomer is selected from the group consisting of diallyldimethyl ammonium chloride, diallyldiethyl ammonium chloride, diallyldimethyl ammonium bromide, and diallyldiethyl ammonium bromide.

The cationic polymer component of this invention may contain one or more other mer units without departing from the concept of the invention. Copolymers, terpolymers, etc., such as for example polymers comprising diallyldimethyl ammonium chloride and acrylamide or acryloyloxyethyltrimethyl ammonium chloride and acrylamide may be employed as the cationic polymer component of the instant invention. In a preferred embodiment of this invention, the cationic polymer is a copolymer derived from at least one of the hereinbefore mentioned cationic monomers and of at least one of a nonionic monomer selected from the group consisting of acrylamide, methacrylamide, and N,N-dimethyl acrylamide, wherein the ratio of the cationic monomer to the nonionic monomer is from about 99:1 to about 1:99, inclusive. Preferably, the weight ratio of the cationic monomer to the nonionic monomer is from about 10 to about 95, inclusive. It will be appreciated by those persons skilled in the art that the ratio of mer units in such copolymers generally is determined by the quantity of cationic units necessary in the instant composition to impart the desired moisture reduction of the aqueous mineral slurry concentrate while achieving the desired production of the resultant filter cake when such treated mineral slurry concentrate is undergoing the water removal (dewatering) process, such as for example but not limited to filtration, centrifugation, or combinations thereof, with or without pressure or under vacuum.

In another embodiment of this invention, the process includes wherein the nonionic surfactant is a mixture of the alcohol ethoxylate, as described herein, and an other alcohol (i.e. the other alcohol is different than the alcohol ethoxylate). The other alcohol is an alcohol having from about one carbon atom to about 18 carbon atoms, inclusive, and preferably has from about 8 carbon atoms to about 13 carbon atoms, inclusive. The other alcohol may be primary or secondary and may be linear or branched, and mixtures thereof. The nonionic surfactant mixture may be comprised from about 1 weight percent to about 99 weight percent, inclusive, other alcohol.

Another embodiment of the process of this invention as described herein includes wherein the nonionic surfactant is an amine ethoxylate (i.e. an ethoxylated amine) having a chemical formula R—N—((CH$_2$CH$_2$O)$_x$—H)$_2$ wherein x is an integer from about 1 to about 15, inclusive, and R is a linear or branched aliphatic radical comprising from about 6 to about 24 carbon atoms, inclusive, in the alkyl moiety, or wherein the nonionic surfactant is a mixture of the amine ethoxylate and the alkyl ethoxylate alcohol, as described herein. The nonionic surfactant mixture may be comprised from about 1 weight percent to about 99 weight percent, inclusive, amine ethoxylate.

An effective amount of the nonionic surfactant and cationic polymer should be employed in the process of this invention. It will be appreciated by those persons skilled in the art that the dosage of the nonionic surfactant and the dosage of the cationic polymer added to the aqueous mineral slurry concentrate being treated is dependent upon the degree of moisture removal and filter cake production that is desired. Preferably, in the process of the instant invention, an effective amount is, for example but not limited to, at least about 0.005 pounds to about 3.0 pounds, inclusive, of the nonionic surfactant per one long ton of mineral slurry concentrate on a dry minerals weight basis, and from at least about 0.002 pounds to about 3.0 pounds, inclusive, of the cationic polymer per one long ton of the mineral slurry concentrate on a dry minerals weight basis. As used herein, the term "long ton" (1T) refers to two thousand two hundred and forty pounds (2,240 lbs.).

As used herein, a "high molecular weight" cationic polymer refers to a weight average molecular weight above about 100,000, inclusive, and preferably above 1,000,000. More preferably, the high molecular weight cationic polymer of the instant invention has a weight average molecular weight above about 2,000,000, and most preferably a weight average molecular weight ranging from about 2,000,000 to 20,000,000, or greater.

The nonionic surfactants of the instant invention may be prepared using any conventional technique that is known by those skilled in the art. The cationic polymers of the instant invention may be prepared using any conventional polymerization technique known by those persons skilled in the art.

The nonionic surfactant and the cationic polymers of the instant invention may be added to the aqueous mineral slurry concentrate at any convenient point to the aqueous mineral slurry concentrate. It will be appreciated by those skilled in the art that the exact points (locations) of addition will be mill specific. There is no required order of addition for adding the nonionic surfactant and the cationic polymer to the aqueous concentrated mineral slurry. The nonionic surfactant may be added to the aqueous mineral slurry concentrate first and then followed by the addition of the cationic polymer to the nonionic surfactant treated aqueous mineral slurry concentrate, or the cationic polymer may be initially added to the aqueous mineral slurry concentrate and then the nonionic surfactant may be added to the cationic polymer treated aqueous mineral slurry concentrate. In another embodiment of this invention, the process includes wherein the nonionic surfactant and the cationic polymer may be simultaneously added to the aqueous mineral slurry concentrate, either at the same or different points of addition. Further, another embodiment of this invention provides a process including wherein the nonionic surfactant and the cationic polymer may be premixed together to form a nonionic surfactant and cationic polymer mixture and then this mixture is added to the aqueous mineral slurry concentrate. Any suitable method of addition known in the art may be utilized. A preferred method of addition includes adequate dilution to accomplish dispersion of the nonionic surfactant and the cationic polymer throughout the aqueous mineral slurry concentrate.

In another embodiment of the instant invention, an improved mineral slurry concentrate composition is provided consisting essentially of an aqueous mineral slurry concentrate, a nonionic surfactant, and a cationic polymer. The nonionic surfactant and the cationic polymer of the invention are as described herein.

In yet another embodiment of the instant invention, an improved mineral concentrate filter cake is provided consisting essentially of a substantially dewatered mineral concentrate, a nonionic surfactant, and a cationic polymer. The nonionic surfactant and the cationic polymer of the invention are as described herein.

EXAMPLES

The following examples demonstrate the invention in greater detail. These examples are not intended to limit the scope of the invention in any way. In the present invention, the use of nonionic dewatering aids in conjunction with cationic polymers optimally reduce the moisture content of a mineral slurry concentrate while boosting the production of a resulting mineral concentrate filter cake that heretofore was not possible with no treatment at all or with the use of a nonionic dewatering aid alone, or with the use of an anionic dewatering aid alone or in combination with a cationic polymer. In the examples set forth in Tables 1 through 5, the following compositions were employed as the nonionic surfactants (DWA) and cationic polymers (otherwise referred to as process aids "PA" herein):

Nonionic Surfactant (Dewatering Aids "DWA"):

| | |
|---|---|
| DWA A | C12-C14 secondary ethoxylated alcohol, wherein "x" is from 2 to 5 |
| DWA B | C12-C14, branched primary alcohol ethoxylate, wherein "x" is from 2 to 5 |
| DWA C | C12-C14, secondary alcohol ethoxylate, wherein "x" is from 2 to 5 |
| DWA E | C11 alcohol ethoxylate, wherein "x" is from 3 to 7 |
| DWA F | mixture of C18 amine ethoxylate (having from 2 to 5 degrees of ethoxylation) and C11-C16 alcohol ethoxylate, wherein "x" is from 2 to 5 |

Cationic polymer (Process Aids "PA"):

| | |
|---|---|
| PA I | 40 mole % charge copolymer of Acryloyloxyethyltrimethyl ammonium chloride and acrylamide, about 2 to about 6 million average molecular weight |
| PA II | 80 mole % charge copolymer of Acryloyloxyethyltrimethyl ammonium chloride and acrylamide, to about 9 million average molecular weight. |
| PA III | 60 mole % charge, copolymer of Acryloyloxyethyltrimethyl ammonium chloride and acrylamide, about 9 to about 13 million average molecular weight. |
| PA V | 100 mole % charge poly diallydimethylammonium chloride, about 100,000 average molecular weight |
| PA VI | 100 mole % charge poly diallydimethylammonium chloride, about 500,000 average molecular weight |
| PA VII | 100 mole % charge Mannich condensation polymer of acrylamide, dimethylamine, and formaldehyde, 1:1:1 molar ratio, about 3.6 million average molecular weight to 4.7 million average molecular weight |
| PA VIII | 10 mole % charge copolymer of Acryloyloxyethyltrimethyl ammonium chloride and Acrylamide, about 2 to about 6 million average molecular weight |

| | |
|---|---|
| PA IX | 30 mole % charge, copolymer of Acryloyloxyethyltrimethyl ammonium chloride and acrylamide, about 4 to about 9 million average molecular weight |

All of the iron ore tested was magnetite which has a formula of $Fe_3O_4$ which is different from hematite, $Fe_2O_3$. The differences in the molecular compositions of magnetite and hematite based iron ore give different crystal lattice structures and subsequently different chemical and physical properties.

The following procedure was followed in the examples set forth in Tables 1 and 5 for performing the magnetite filtration step of the process of this invention as described herein:

Example of Analytical Solids Liquid Separation Laboratory Test Filter Leaf Test (a) A sample of ore concentrate is taken from the solids/liquid separation unit process feed. In this example we assume it is a vacuum filter. For simplicity we will call it "Filter Feed" (i.e. the mineral slurry concentrate). A typical sample may be 20-30 gallons in 5 gallon buckets. We deliver the Filter Feed sample buckets to a laboratory where we have a bench scale Filter Leaf Test device set up. A Filter Leaf Test is commercially available from Komline-Sanderson (Peapack, N.J., USA).

(b) The Filter Leaf Test device comprises a vacuum pump, a vacuum flask to remove filtrate that is pulled thru the filter media, and a "filter leaf" which is a flat porous plate over which the filter media is placed and suction is applied thru the filter media by a hose connected to the vacuum pump. The filter leaf size surface area is a known value so plant filter productivity can be estimated based on laboratory results.

(c) The buckets are stirred to uniformity and density is checked (and equalized if necessary to match the other pails) with a standard Marcy Cup and Density Scale, commercially available from Legends Inc. (Sparks, Nev., USA).

(d) A sample of 5 liters is drawn from the larger sample bucket(s) and set under a stirrer to keep the sample uniform.

(e) When ready to test, or run a filter leaf test, the vacuum on the vacuum pump is set to plant conditions and turned on. The stirrer in the 5 liter sample is shut off and the filter leaf is immersed in the 5 liter sample of Filter Feed to a preset depth.

(f) After a pre-determined time (set to duplicate plant conditions) the filter leaf is removed from the Filter Feed sample and the stirrer is turned back on.

(g) The vacuum is left on for, again a pre-determined amount of time to simulate plant vacuum dry time for the filter cake.

(h) Once the cake formation and dry times are completed exactly, the vacuum is turned off and the filter cake is removed from the filter leaf filter media. By getting the wet and oven dried weights (4 hours at 100 degrees Centigrade) of the filter cake produced, one can determine the filter cake % moisture and the dry weight of filter production. Results and treatment(s), if any, are recorded by individual Filter Leaf test.

(i) Dewatering aid and process aid can be added based on the remaining sample being stirred. The addition is accomplished with the use of syringes and a measured amount based on the volume, density, and specific gravity of the 5 liter sample to achieve an accurate dosage ((pounds per long ton ("#/lT") are typical units in ore slurries). A new Filter Leaf test is run using consistently the same procedure. The differences in cake production and moisture of individual filter leaf tests can then be compared to the untreated sample(s) results to get the relative improvements in filter cake productivity and filter cake moisture (drier being better). Generally, in the results shown in Tables 1 through 5, the nonionic surfactant (dewatering aid) was added initially to the aqueous mineral slurry concentrate followed by (sequentially) the addition of the cationic polymer (process aid) to the nonionic surfactant treated aqueous mineral slurry concentrate. Applicants have achieved similar results as shown in Tables 1 through 5 when the order of addition is varied, for example but not limited to, when the process aid is initially added to the aqueous mineral slurry concentrate followed by the addition of the dewatering aid, or when the dewatering aid and the process aid are first mixed together and then added as a mixture to the aqueous mineral slurry concentrate. Thus, it will be understood by those persons skilled in the art that the order of and the physical point(s) of the addition(s) of the dewatering aid and the process aid to the untreated aqueous mineral slurry concentrate were not crucial to achieving the synergistic results of the Applicants' invention.

(j) The cycles can be repeated as often as is required to test many dosages/combinations of filter aids and process aids. Continuous comparison of untreated results assures testing accuracy.

As set forth in Tables 1 and 4, the Iron Ore Slurry I was obtained from Minnesota Mesabi Iron Ore Range-Mineral Processing Facility, and comprised a mineral iron ore of a magnetite composition. The Iron Ore Slurry III set forth in Tables 2 and 5 was obtained from Michigan Negaunee Iron Ore Range-Mineral Processing Facility 1, and comprised a mineral ore of a magnetite composition. Iron Ore Slurry II set forth in Table 3 was obtained from Michigan Negaunee Iron Ore Range-Mineral Processing Facility 2, and comprised a mineral iron ore of a magnetite composition.

TABLE 1

EFFECTS of DEWATERING AID and PROCESS AID on FILTER CAKE PRODUCTION and FILTER CAKE MOISTURE
Iron Ore Slurry I
Location: Minnesota Mesabi Iron Ore Range - Mineral Processing Facility

| Dewatering Aid | Process Aid | Dewat. Aid Dose #/lT | Proc. Aid Dose #/lT | % Production | % Prod. increase | % Moisture | % Moisture decrease |
|---|---|---|---|---|---|---|---|
| NONE * | NONE | NONE | NONE | 100 | 0 | 10.84 | 0 |
| A | | 0.1 | | 101 | 1 | 9.93 | 8.4 |
| A | PA V | 0.1 | 0.005 | 104.42 | 4.4 | 9.45 | 12.8 |
| A | PA V | 0.1 | 0.02 | 118.55 | 18.6 | 9.64 | 11.1 |

TABLE 1-continued

EFFECTS of DEWATERING AID and PROCESS AID on FILTER
CAKE PRODUCTION and FILTER CAKE MOISTURE
Iron Ore Slurry I
Location: Minnesota Mesabi Iron Ore Range - Mineral Processing Facility

| Dewatering Aid | Process Aid | Dewat. Aid Dose #/lT | Proc. Aid Dose #/lT | % Production | % Prod. increase | % Moisture | % Moisture decrease |
|---|---|---|---|---|---|---|---|
| A | PA V | 0.1 | 0.05 | 120.88 | 20.9 | 9.87 | 8.9 |
| NONE * | NONE | NONE | NONE | 100 | 0 | 10.84 | 0 |
| A | PA VI | 0.1 | 0.005 | 108.35 | 8.4 | 10.32 | 4.8 |
| A | PA VI | 0.1 | 0.02 | 110.07 | 10.1 | 10.42 | 3.9 |
| A | PA VI | 0.1 | 0.05 | 117.51 | 17.5 | 10.23 | 5.6 |
| A | PA VI | 0.1 | 0.1 | 118.73 | 18.7 | 10.51 | 3 |
| NONE * | NONE | NONE | NONE | 100 | 0 | 10.84 | 0 |
| A | PA I | 0.1 | 0.02 | 102.03 | 2 | 10.17 | 6.2 |
| A | PA I | 0.1 | 0.05 | 110.63 | 10.6 | 10.04 | 7.4 |
| A | PA I | 0.1 | 0.1 | 126.35 | 26.4 | 10.25 | 5.4 |
| NONE * | NONE | NONE | NONE | 100 | 0 | 10.84 | 0 |
| A | PA VIII | 0.1 | 0.02 | 100 | 0 | 10.2 | 5.9 |
| A | PA VIII | 0.1 | 0.05 | 111.67 | 11.7 | 10.07 | 7.1 |
| A | PA VIII | 0.1 | 0.1 | 123.46 | 23.5 | 10.5 | 3.1 |
| NONE * | NONE | NONE | NONE | 100 | 0 | 10.84 | 0 |
| A | PA III | 0.1 | 0.005 | 103.87 | 3.9 | 10.34 | 4.6 |
| A | PA III | 0.1 | 0.02 | 117.26 | 17.3 | 10.07 | 7.1 |
| A | PA III | 0.1 | 0.05 | 140.29 | 40.3 | 10.37 | 4.3 |
| A | PA III | 0.1 | 0.1 | 175.92 | 75.9 | 10.46 | 3.5 |
| NONE * | NONE | NONE | NONE | 100 | 0 | 10.84 | 0 |
| A | PA IX | 0.1 | 0.005 | 112.16 | 12.2 | 9.65 | 11 |
| A | PA IX | 0.1 | 0.02 | 123.28 | 23.3 | 9.92 | 8.5 |
| A | PA IX | 0.1 | 0.05 | 139.19 | 39.2 | 9.61 | 11.3 |
| A | PA IX | 0.1 | 0.1 | 175.61 | 75.6 | 10 | 7.7 |
| NONE * | NONE | NONE | NONE | 100 | 0 | 10.84 | 0 |
| A | PA VII | 0.1 | 0.005 | 117.1 | 17.1 | 9.69 | 10.6 |
| A | PA VII | 0.1 | 0.02 | 129.19 | 29.2 | 9.83 | 9.3 |
| A | PA VII | 0.1 | 0.05 | 151.84 | 51.8 | 9.45 | 12.8 |
| A | PA VII | 0.1 | 0.1 | 174.43 | 74.4 | 9.71 | 10.4 |
| NONE * | NONE | NONE | NONE | 100 | 0 | 10.84 | 0 |
| A | PA II | 0.1 | 0.02 | 104.24 | 4.2 | 10.61 | 2.1 |
| A | PA II | 0.1 | 0.05 | 119.39 | 19.4 | 9.86 | 9 |
| A | PA II | 0.1 | 0.1 | 163.59 | 63.6 | 9.96 | 8.1 |

* NONE: is average of all samples with no process aid or dewatering aid

TABLE 2

EFFECTS of DEWATERING AID and various PROCESS AIDs on FILTER
CAKE PRODUCTION and FILTER CAKE MOISTURE
Iron Ore Slurry III
Location: Michigan Negaunee Iron Ore Range - Mineral Processing Facility 1

| Dewatering Aid | Process Aid | DW A Dose #/lT | PA Dose #/lT | % Production | % Prod. increase | % M (Moisture) | % M decrease |
|---|---|---|---|---|---|---|---|
| none | none | none | none | 100 | | 13.5 | |
| A | none | 0.1 | none | 100.3 | 0.3 | 12 | 11.1 |
| A | PA I | 0.1 | 0.04 | 105.2 | 5.2 | 12.5 | 7.4 |
| none | none | none | none | 100 | | 13.2 | |
| A | none | 0.2 | none | 98.4 | -1.5 | 10.9 | 17.4 |
| A | PA I | 0.2 | 0.03 | 97.6 | 2.4 | 10.9 | 17.4 |
| A | PA I | 0.2 | 0.06 | 100.6 | 0.6 | 11.2 | 15.2 |
| A | PA I | 0.2 | 0.09 | 100.3 | 0.3 | 11.4 | 13.6 |
| none | none | none | none | 100 | | 13.1 | |
| A | none | 0.3 | none | 98 | -2 | 10.1 | 22.9 |
| A | PA II | 0.3 | 0.06 | 111.3 | 11.3 | 10.3 | 21.4 |
| A | PA II | 0.3 | 0.12 | 132.5 | 32.5 | 10.9 | 16.8 |
| A | PA II | 0.3 | 0.18 | 160.1 | 60.1 | 11.6 | 11.5 |
| none | none | none | none | 100 | | 13 | |
| A | none | 0.5 | none | 87.7 | -12.3 | 9.3 | 28.5 |
| A | PA II | 0.5 | 0.08 | 110 | 10 | 10.3 | 20.8 |
| A | PA II | 0.5 | 0.12 | 124 | 24 | 10.4 | 20 |
| none | none | none | none | 100 | | 13.5 | |
| A | none | 0.1 | none | 96 | -4 | 11.3 | 16.3 |
| A | PA II | 0.1 | 0.04 | 109.4 | 9.4 | 12.1 | 10.4 |
| A | PA II | 0.1 | 0.08 | 109.5 | 9.5 | 12.5 | 7.4 |
| A | PA II | 0.1 | 0.12 | 117 | 17 | 13.2 | 2.2 |
| none | none | none | none | 100 | | 13.3 | |
| A | none | 0.3 | none | 90.9 | -9.1 | 10 | 24.8 |

TABLE 2-continued

EFFECTS of DEWATERING AID and various PROCESS AIDs on FILTER CAKE PRODUCTION and FILTER CAKE MOISTURE
Iron Ore Slurry III
Location: Michigan Negaunee Iron Ore Range - Mineral Processing Facility 1

| Dewatering Aid | Process Aid | DW A Dose #/lT | PA Dose #/lT | % Production | % Prod. increase | % M (Moisture) | % M decrease |
|---|---|---|---|---|---|---|---|
| A | PA III | 0.3 | 0.08 | 106 | 6 | 11 | 17.3 |
| A | PA III | 0.3 | 0.12 | 114 | 14 | 11.4 | 14.3 |
| none | none | none | none | 100 | | 13.2 | |
| A | none | 0.5 | none | 90.2 | −9.8 | 9.3 | 29.5 |
| A | PA III | 0.5 | 0.08 | 106 | 6 | 9.9 | 25 |
| A | PA III | 0.5 | 0.12 | 118.6 | 18.6 | 10.2 | 22.7 |
| none | none | none | none | 100 | | 13 | |
| A | none | 0.3 | none | 92.8 | −7.2 | 9.9 | 23.8 |
| A | PA VII | 0.3 | 0.4 | 109.7 | 9.7 | 10.2 | 21.5 |
| A | PA VII | 0.3 | 0.8 | 117.6 | 17.6 | 10.4 | 20 |
| A | PA VII | 0.3 | 1.2 | 131.7 | 31.7 | 10.8 | 16.9 |
| none | none | none | none | 100 | | 13.4 | |
| A | none | 0.5 | none | 93.2 | −6.8 | 9.5 | 29.1 |
| A | PA VII | 0.5 | 0.4 | 101.2 | 1.2 | 9.4 | 29.9 |
| A | PA VII | 0.5 | 0.8 | 113.7 | 13.7 | 9.7 | 27.6 |
| A | PA VII | 0.5 | 1.2 | 120.5 | 20.5 | 9.8 | 26.9 |
| none | none | none | none | 100 | | 13.2 | |
| C | none | 0.3 | none | 93 | −7 | 9.7 | 26.5 |
| C | PA VII | 0.3 | 0.4 | 104.2 | 4.2 | 10.2 | 22.7 |
| C | PA VII | 0.3 | 0.8 | 122.7 | 22.7 | 10.5 | 20.5 |
| C | PA VII | 0.3 | 1.2 | 124.1 | 24.1 | 10.8 | 18.2 |
| none | none | none | none | 100 | | 13.4 | |
| C | none | 0.5 | none | 94 | −6 | 9.7 | 27.6 |
| C | PA VII | 0.5 | 0.4 | 100.2 | 0.2 | 9.7 | 27.6 |
| C | PA VII | 0.5 | 0.9 | 109.1 | 9.1 | 9.9 | 26.1 |
| C | PA VII | 0.5 | 1.2 | 125.8 | 25.8 | 10 | 25.4 |
| none | none | none | none | 100 | | 13.1 | |
| A | none | 0.3 | none | 93.6 | −6.4 | 9.9 | 24.4 |
| A | PA VI | 0.3 | 0.16 | 100.4 | 0.4 | 10.8 | 17.6 |
| none | none | none | none | 100 | | 12.9 | |
| C | none | 0.1 | none | 93.9 | −6.1 | 12.1 | 6.2 |
| C | PA III | 0.1 | 0.04 | 104.6 | 4.6 | 12.3 | 4.7 |
| C | PA III | 0.1 | 0.08 | 123.2 | 23.2 | 12.9 | 0 |

TABLE 3

EFFECTS of DEWATERING AID and various PROCESS AID on FILTER CAKE PRODUCTION and FILTER CAKE MOISTURE
Iron Ore Slurry II
Location: Michigan Negaunee Iron Ore Range - Mineral Processing Facility 2

| Dewatering Aid | Process Aid | Dewat. Aid Dose #/lT | Proc. Aid Dose #/lT | % Production | % Prod. increase | % M | % Moisture decrease |
|---|---|---|---|---|---|---|---|
| NONE | NONE | NONE | NONE | 100 | 0 | 12.2 | 0 |
| A | NONE | 0.25 | NONE | 89 | −11 | 9.9 | 19 |
| A | PA VII | 0.25 | 0.4 | 119 | 19 | 10 | 18 |
| A | PA VII | 0.25 | 0.6 | 135 | 35 | 10.2 | 16 |

TABLE 4

EFFECTS of DEWATERING AID and PROCESS AID on FILTER CAKE PRODUCTION and FILTER CAKE MOISTURE
Iron Ore Slurry I
Location: Minnesota Mesabi Iron Ore Range - Mineral Processing Facility

| Dewatering Aid | Process Aid | Dewat. Aid Dose #/lT | Proc. Aid Dose #/lT | % Production | % Prod. increase | % M | % Moisture decrease |
|---|---|---|---|---|---|---|---|
| NONE | NONE | NONE | NONE | 100 | 0 | 10.3 | 0 |
| B | NONE | 0.5 | NONE | 92 | −8 | 7.4 | 28 |
| B | PA VII | 0.2 | 0.8 | 146 | 46 | 9.9 | 4 |
| B | PA VII | 0.5 | 1 | 117 | 17 | 7.9 | 23 |
| B | PA VII | 0.5 | 1.5 | 170 | 70 | 8.44 | 18 |
| B | PA VII | 0.5 | 2 | 170 | 70 | 8.45 | 18 |

TABLE 5

EFFECTS of DEWATERING AID and PROCESS AID on FILTER
CAKE PRODUCTION and FILTER CAKE MOISTURE
Iron Ore Slurry III
Location: Michigan Negaunee Iron Ore Range: Processing Facility I

| Dewatering Aid | Process Aid | Dewat. Aid Dose #/lT | Proc. Aid Dose #/lT | % Production | % Prod. increase | % M | % Moisture decrease |
|---|---|---|---|---|---|---|---|
| NONE | NONE | NONE | NONE | 100.00 | 0.0 | 14.1 | 0 |
| E | NONE | 0.1 | NONE | 97.14 | −2.9 | 13.9 | 1 |
| E | NONE | 0.3 | NONE | 91.16 | −8.8 | 11.4 | 19 |
| E | NONE | 0.5 | NONE | 74.64 | −25.4 | 10.6 | 25 |
| NONE | NONE | NONE | NONE | 100.00 | 0.0 | 14.4 | 0 |
| E | PA VII | 0.5 | 1.5 | 120.85 | 20.9 | 9.2 | 36 |
| NONE | NONE | NONE | NONE | 100.00 | 0.0 | 13.9 | 0 |
| A | NONE | 0.1 | NONE | 100.09 | 0.1 | 13 | 6 |
| A | NONE | 0.3 | NONE | 94.87 | −5.1 | 10.8 | 22 |
| A | NONE | 0.5 | NONE | 94.87 | −5.1 | 10.1 | 27 |
| A | PA VII | 0.5 | 0.8 | 117.49 | 17.5 | 10 | 28 |
| NONE | NONE | NONE | NONE | 100.00 | 0.0 | 14.2 | 0 |
| B | NONE | 0.1 | NONE | 98.47 | −1.5 | 12.7 | 11 |
| B | NONE | 0.3 | NONE | 97.66 | −2.3 | 10.5 | 26 |
| B | NONE | 0.5 | NONE | 104.41 | 4.4 | 10.2 | 28 |
| B | PA VII | 0.5 | 0.8 | 121.76 | 21.8 | 9.8 | 31 |
| NONE | NONE | NONE | NONE | 100.00 | 0.0 | 14.2 | 0 |
| F | NONE | 0.1 | NONE | 104.30 | 4.3 | 13.9 | 2 |
| F | NONE | 0.3 | NONE | 110.38 | 10.4 | 12.2 | 14 |
| F | NONE | 0.5 | NONE | 107.70 | 7.7 | 12.1 | 15 |
| F | PA VII | 0.5 | 0.8 | 122.38 | 22.4 | 11.3 | 20 |

The data set forth in Tables 1 thru 5 show that the process of the present invention that employs a nonionic surfactant (dewatering aid) in conjunction with a cationic polymer (process aids) synergistically lowers the residual water contents of filter cakes and increases the production of solids from 9% to over 50% compared to the use of the nonionic surfactant (dewatering aid) by itself.

Applicants supply the following prophetic examples of the process of this invention using methacrylate versions of cationic polymer PA II or cationic polymer PA III, in conjunction with dewatering aid DWA A, as set forth above. Applicants believe that % production increase would be from about 110% to about 150% and that the % moisture would be from about 10% to 10.5%.

FIG. 1 shows the moisture versus production that can be achieved using the process and compositions of the instant invention. As shown in FIG. 1, the process and compositions of the instant invention (identified by the diamonds and circles on FIG. 1) provide synergistic results in increasing the percent production of the filter cake (y-axis of FIG. 1) while lowering the percent moisture of the resulting filter cake (x-axis of FIG. 1) versus no treatment (identified by the triangle on FIG. 1), or with the use of a nonionic surfactant (dewatering aid DWA A) alone. It is known by those skilled in the art that, generally, adding a cationic polymer alone to a mineral slurry concentrate will increase the percent moisture in the resulting filter cake. Thus, it will be appreciated by those persons skilled in the art that the synergistic results obtained by the present invention go far beyond the results achievable with any of the previously known chemistries.

Whereas particular embodiments of the instant invention have been described for purposes of illustration, it will be evident to those persons skilled in the art that numerous variations and details of the instant invention may be made without departing from the instant invention as defined in the appended claims.

We claim:

1. A mineral slurry concentrate composition consisting essentially of:
an aqueous mineral slurry concentrate;
a nonionic surfactant that is an alkyl ethoxylate alcohol having the chemical formula R—(OCH$_2$CH$_2$)$_x$OH wherein x is an integer from about 1 to 15, inclusive, and R is a linear or branched aliphatic radical comprising from about 6 to about 24 carbon atoms, inclusive, in the alkyl moiety, and having a hydrophilic-lipophilic balance number from about 1 to about 15, inclusive, an amine ethoxylate having the chemical formula R—N—((CH$_2$CH$_2$O)$_x$—H)$_2$ wherein x is an integer from about 1 to about 15, inclusive, and R is a linear or branched aliphatic radical comprising from about 6 to about 24 carbon atoms, inclusive, in the alkyl moiety, or a mixture of said alkyl ethoxylate alcohol and said amine ethoxylate, wherein an effective amount of said nonionic surfactant is from about 0.005 pounds to about 3.0 pounds, inclusive, per one long ton of said aqueous mineral slurry concentrate on a dry mineral weight basis; and
a cationic polymer that is a Mannich condensation polymer or a polymer derived from at least one cationic monomer selected from the group consisting of acryloyloxyethyltrimethyl ammonium chloride, acryloyloxyethyltrimethyl ammonium methosulfate, aminomethylated polyacrylamide, methacrylamidopropyltrimethyl ammonium chloride, acrylamidopropyltrimethyl ammonium chloride, methacryloyloxyethyltrimethyl ammonium chloride, methacryloyloxyethyltrimethyl ammonium methosulfate, diallyldimethyl ammonium chloride, diallyldiethyl ammonium chloride, diallyldimethyl ammonium bromide, diallyldiethyl ammonium bromide, a quaternary diallyldialkyl ammonium monomer, a cationic acrylamide monomer, a quaternized derivative of an acrylate or methacrylate, salts thereof, and combinations thereof, wherein an effective amount of said cationic polymer is from about 0.002 pounds to about 3.0 pounds, inclusive, per one long ton of aqueous mineral slurry concentrate on a dry mineral weight basis, wherein the amounts are effective in dewatering the aqueous mineral concentrate slurry, and producing a filter cake, and in decreasing a moisture content and for increasing production of the filter cake compared to the use of the nonionic surfactant alone.

2. The mineral slurry concentrate of claim 1 wherein said alkyl ethoxylate alcohol comprises an R group having from about 6 to about 24 carbon atoms, inclusive, and is one of a linear primary ethoxylated alcohol, a branched primary ethoxylated alcohol, or a secondary ethoxylated alcohol.

3. The mineral slurry concentrate of claim 2 including wherein said R group has from about 11 to about 16, inclusive, carbon atoms.

4. The mineral slurry concentrate of claim 1 wherein said nonionic surfactant is a mixture of said alkyl ethoxylate alcohol and an other alcohol.

5. The mineral slurry concentrate of claim 4 wherein said other alcohol comprises from about one carbon atom to about 18 carbon atoms, inclusive, and is one of a primary or secondary alcohol, and is either linear or branched, and mixtures thereof.

6. The mineral slurry concentrate of claim 1 wherein said cationic polymer is a copolymer that is derived from a cationic monomer that is a quaternary diallyldialkyl ammonium monomer, and an acrylamide.

7. The mineral slurry concentrate of claim 1 wherein said cationic polymer is a copolymer derived from a cationic monomer that is acryloyloxyethyltrimethyl ammonium chloride, and an acrylamide.

8. The mineral slurry concentrate of claim 1 wherein said cationic polymer is polydiallyldimethylammonium chloride.

9. The mineral slurry concentrate of claim 1 wherein said cationic polymer is a Mannich condensation polymer.

10. The mineral slurry concentrate of claim 9 wherein said Mannich condensation polymer comprises acrylamide, dimethylamine or diethylamine, and formaldehyde.

11. The mineral slurry concentrate of claim 1 wherein said cationic polymer is derived from at least one cationic monomer selected from the group consisting of acryloyloxyethyltrimethyl ammonium chloride, acryloyloxyethyltrimethyl ammonium methosulfate, aminomethylated polyacrylamide, methacrylamidopropyltrimethyl ammonium chloride, acrylamidopropyltrimethyl ammonium chloride, methacryloyloxyethyltrimethyl ammonium chloride, methacryloyloxyethyltrimethyl ammonium methosulfate, diallyldimethyl ammonium chloride, diallyldiethyl ammonium chloride, diallyldimethyl ammonium bromide, and diallyldiethyl ammonium bromide.

12. A mineral concentrate filter cake consisting essentially of:
    a substantially dewatered mineral concentrate filter cake;
    a nonionic surfactant that is an alkyl ethoxylate alcohol having the chemical formula R—(OCH$_2$CH$_2$)$_x$OH wherein x is an integer from about 1 to 15, inclusive, and R is a linear or branched aliphatic radical comprising from about 6 to about 24 carbon atoms, inclusive, in the alkyl moiety, and having a hydrophilic-lipophilic balance number from about 1 to about 15, inclusive, an amine ethoxylate having the chemical formula R—N—((CH$_2$CH$_2$O)$_x$—H)$_2$ wherein x is an integer from about 1 to about 15, inclusive, and R is a linear or branched aliphatic radical comprising from about 6 to about 24 carbon atoms, inclusive, in the alkyl moiety, or a mixture of said alkyl ethoxylate alcohol and said amine ethoxylate, wherein an effective amount of said nonionic surfactant is from about 0.005 pounds to about 3.0 pounds, inclusive, per one long ton of said aqueous mineral slurry concentrate on a dry mineral weight basis; and
    a cationic polymer that is a Mannich condensation polymer or a polymer derived from at least one cationic monomer selected from the group consisting of acryloyloxyethyltrimethyl ammonium chloride, acryloyloxyethyltrimethyl ammonium methosulfate, aminomethylatedpolyacrylamide, methacrylamidopropyltrimethyl ammonium chloride, acrylamidopropyltrimethyl ammonium chloride, methacryloyloxyethyltrimethyl ammonium chloride, methacryloyloxyethyltrimethyl ammonium methosulfate, diallyldimethyl ammonium chloride, diallyldiethyl ammonium chloride, diallyldimethyl ammonium bromide, diallyldiethyl ammonium bromide, a quaternary diallyldialkyl ammonium monomer, a cationic acrylamide monomer, a quaternized derivative of an acrylate or methacrylate, salts thereof, and combinations thereof, wherein an effective amount of said cationic polymer is from about 0.002 pounds to about 3.0 pounds, inclusive, per one long ton of aqueous mineral slurry concentrate on a dry mineral weight basis, wherein the amounts are effective in producing said dewatered mineral concentrate filter cake, and in decreasing a moisture content and for increasing production of the filter cake compared to the use of the nonionic surfactant alone.

13. The mineral concentrate filter cake of claim 12 wherein said alkyl ethoxylate alcohol comprises an R group having from about 6 to about 24 carbon atoms, inclusive, and is one of a linear primary ethoxylated alcohol, a branched primary ethoxylated alcohol, or a secondary ethoxylated alcohol.

14. The mineral concentrate filter cake of claim 13 including wherein said R group has from about 11 to about 16 carbon atoms, inclusive.

15. The mineral concentrate filter cake of claim 12 wherein said cationic polymer is a copolymer that is derived from a cationic monomer that is a quaternary diallyldialkyl ammonium monomer, and an acrylamide.

16. The mineral concentrate filter cake of claim 12 wherein said cationic polymer is a copolymer that is derived from a cationic monomer that is acryloyloxyethyltrimethyl ammonium chloride, and an acrylamide.

17. The mineral concentrate filter cake of claim 12 wherein said cationic polymer is polydiallyldimethylammonium chloride.

18. The mineral concentrate filter cake of claim 12 wherein said cationic polymer is derived from at least one cationic monomer selected from the group consisting of acryloyloxyethyltrimethyl ammonium chloride, acryloyloxyethyltrimethyl ammonium methosulfate, aminomethylatedpolyacrylamide, methacrylamidopropyltrimethyl ammonium chloride, acrylamidopropyltrimethyl ammonium chloride, methacryloyloxyethyltrimethyl ammonium chloride, methacryloyloxyethyltrimethyl ammonium methosulfate, diallyldimethyl ammonium chloride, diallyldiethyl ammonium chloride, diallyldimethyl ammonium bromide, and diallyldiethyl ammonium bromide.

19. The mineral concentrate filter cake of claim 12 wherein said cationic polymer is a Mannich condensation polymer.

20. The mineral concentrate filter cake of claim 19 wherein said Mannich condensation polymer comprises acrylamide, dimethylamine or diethylamine, and formaldehyde.

21. The mineral concentrate filter cake of claim 12 wherein said nonionic surfactant is a mixture of said alkyl ethoxylate alcohol and an other alcohol.

22. The mineral concentrate filter cake of claim 21 including wherein said other alcohol comprises from about one carbon atom to about 18 carbon atoms, inclusive, and is one of a primary or secondary alcohol, and is either linear or branched, and mixtures thereof.

* * * * *